United States Patent [19]

Mihalko

[11] Patent Number: 5,197,180

[45] Date of Patent: Mar. 30, 1993

[54] METHOD FOR MAKING AN ELECTRIC MOTOR WINDING

[75] Inventor: Emil S. Mihalko, Lansdale, Pa.

[73] Assignee: Faraday Energy Foundation, Atlanta, Ga.

[21] Appl. No.: 759,228

[22] Filed: Sep. 13, 1991

[51] Int. Cl.$^5$ ........................................... H02K 15/06
[52] U.S. Cl. ...................................... 29/596; 29/598; 29/605; 310/43; 310/266; 310/268
[58] Field of Search .......................... 29/598, 605, 596; 310/266, 268, 42, 43

[56] References Cited

U.S. PATENT DOCUMENTS

| | | |
|---|---|---|
| 2,759,116 | 8/1956 | Glass ................................ 29/598 X |
| 3,441,761 | 4/1969 | Painton et al. ................... 29/598 X |
| 3,650,021 | 3/1972 | Kavol ................................... 29/598 |
| 3,831,267 | 8/1974 | Onishi et al. ......................... 29/598 |
| 3,935,909 | 2/1976 | Mabuchi et al. . |
| 3,942,054 | 3/1976 | Kristen et al. . |
| 4,130,769 | 12/1978 | Karube . |
| 4,143,289 | 3/1979 | Williams . |
| 4,317,072 | 2/1982 | Goof et al. . |
| 4,336,475 | 6/1982 | Morinaga et al. . |
| 4,369,383 | 1/1983 | Langley . |
| 4,385,248 | 5/1983 | Laskaris . |
| 4,393,344 | 7/1983 | Whellams . |
| 4,445,061 | 4/1984 | Jackson, Jr. . |
| 4,463,276 | 7/1984 | Nakamuro . |
| 4,547,713 | 10/1985 | Langley et al. . |
| 4,551,645 | 11/1985 | Takahashi et al. . |
| 4,563,808 | 1/1986 | Lender . |
| 4,645,961 | 2/1987 | Malsky . |
| 4,667,123 | 5/1987 | Denk et al. . |
| 4,692,631 | 9/1987 | Dahl . |
| 4,714,851 | 12/1987 | Bertram et al. . |
| 4,733,118 | 3/1988 | Mihalko . |
| 4,734,603 | 3/1988 | van der Heide et al. . |
| 4,937,485 | 6/1990 | Mihalko . |

Primary Examiner—Carl E. Hall
Attorney, Agent, or Firm—Lyon & Delevie

[57] ABSTRACT

A method for making a wound field for an electric motor, generator or alternator includes the steps of continuously winding an insulated conductor into a coil having a first plurality of windings wound in a first direction, and a second plurality of windings wound in a second direction opposite the first direction flattening the coil into a two-layered flat web, and rolling the flat, two-layered web end-to-end into a cylindrical configuration. In one embodiment, a multiphase wound field can be made by winding a plurality of insulated conductors about a common axis to form a group of adjacent coil units. After the first group of coil units is wound, second and subsequent groups can be wound, in alternating directions of winding with respect to the first group, to form an elongate winding assembly. The entire assembly, is then flattened and rolled end-to-end. This increases a wound field that is ready for insertion into a magnetic return path of an electric motor which has a higher density than was previously possible. As a result, current loss due to hysteresis and other features is materially reduced.

29 Claims, 7 Drawing Sheets

METHOD FOR MAKING AN ELECTRIC MOTOR WINDING

BACKGROUND OF THE INVENTION

1. Field of the Invention

This invention relates broadly to the field of electrically powered motors. More specifically, this invention relates to an improved electric motor and a method for winding an electric motor which is simpler and less expensive to perform than previously used methods, and which results in an electric motor winding which is more power efficient than windings heretofore known.

2. Description of the Prior Art

Alternating current (AC) and direct current (DC) brushless motors conventionally have an outer stator surrounding an inner rotor, the rotor being mounted to rotate within the stator.

In most electric motors, the stator includes a number of regularly spaced radially oriented teeth along its inner periphery, which define a corresponding number of slots. The teeth and slots extend along the entire axial length of the stator. Through various techniques which are well known to those skilled in the field, electrical windings are positioned in the slots between the teeth from one end of the stator to another, and around the teeth at the opposite ends of the stator. In this manner, the electrical windings are precisely oriented with respect to the rotor so that AC or switched DC voltage applied to the windings will induce a magnetic field which has a known, predetermined orientation. The electro-magnetic field is designed to react with permanent magnets or inductive windings on the rotor to turn the rotor in a desired direction.

It can be difficult and time consuming to install the electrical windings into a slotted stator, and a fair amount of complicated machinery has been developed over the years to do this. In addition to the manufacturing difficulties presented by the slotted stator configuration, the presence of the teeth which define the slots creates magnetic discontinuities, which can affect the efficiency of the motor. In addition, the presence of the teeth limit the number of windings which can be positioned in the critical area of the stator adjacent to the rotor. This, too, adversely affects the efficiency of the motor. If the entire area on the stator which is adjacent to the rotor could be filled with conductors, motor efficiency would increase, and losses due to factors such as hysteresis would be lessened.

Other forms of motor windings which eliminate stator teeth and slots are known, but most variously require specialized coil forms, specialized winding machines to provide coils of special geometry, or specialized support structures. Such structures are expensive and complicated to manufacture. As a result, despite their known disadvantages, most electrical motors are still being manufactured with the slotted stator configuration.

It is clear that there has existed a long and unfilled need in the prior art for a slotless winding for electrical motors which is inexpensive to manufacture, which is reliable, and which results in a higher winding density than was attainable by use of a slotted winding configuration.

SUMMARY OF THE INVENTION

Accordingly, it is a object of the invention to provide a slotless winding for an electric motor which is reliable and inexpensive to manufacture.

It is further an object of the invention to provide a slotless winding configuration for an electrical motor which results in a winding density which is higher than was permitted by a slotted winding configuration.

It is further an object of the invention to provide a method for manufacturing a wound core for an electric motor which is inexpensive to perform, and which results in a slotless winding configuration which has a higher winding density than was attained by previous slotted winding configurations.

To achieve the above and other objects of the invention, a method of making a wound field for a motor, generator or alternator according to one aspect of the invention includes the steps of winding an insulated conductor into a coil having a first plurality of individual windings wound in a first direction about an axis, and a second plurality of windings wound around the axis in a second direction opposite the first direction; compressing or flattening the coil as by reorienting the individual windings thereof relative to the axis so as to obtain a substantially flat, two-layered web having a first axial end and a second axial end; wherein a peripheral section of an individual winding originally wound in the first direction overlies a corresponding diametrically-opposite peripheral section of another individual winding originally wound in the second direction and rolling the flat web into the wound field by joining the first axial end to the second axial end.

According to a second aspect of the invention, a method of making a multiphase wound field for an electric motor, generator or alternator includes the steps of (a) simultaneously winding at least two insulated conductors about a common axis at axially-spaced intervals in a first winding direction to form a group of at least two adjacent coil units; (b) axially shifting the insulated conductor with respect to the coil units by a distance of approximately (n−1) times the axial width of the coil unit, with n being the number of conductors being wound; (c) simultaneously winding a second group of adjacent coil units as provided in step (a) in a second winding direction which is opposite the first winding direction, the second group of coil units being adjacent to the first group of coil units; (d) compressing or flattening the adjacent coil groups as by reorienting the individual windings forming the coil units thereof relative to the axis so as to obtain a substantially flat, two-layered web having a first axial end and a second axial end, wherein a peripheral section of a coil unit originally wound in the first direction overlies a corresponding diametrically-opposite peripheral section of another coil unit originally wound in the second direction; and (e) rolling the flat web into a wound field by joining the first axial end to the second axial end.

According to a third aspect of the invention, an electric motor, generator or alternator according to the invention includes a rotor, and a slotless stator, the stator having a wound field which comprises at least first and second insulated conductors, the first and second conductors being wound in a first winding direction to form, respectively, first and second coil units which constitute a first coil group; the conductors being further wound in a second, opposite winding direction to form a second coil group which is adjacent to the first coil group; the wound coils being compressed and oriented as by flattening same so that a peripheral segment or "leg" of the first coil unit overlies a corresponding diametrically-opposite peripheral segment or "leg" of a coil unit in the second winding group which is also formed by the first insulated conductor, and so that a leg of the second coil unit overlies a corresponding diametrically-opposite leg of a second coil unit in the second winding group which is also formed by the second insulated conductor, whereby the overlying legs create a dense, compacted winding for generating an oriented magnetic field for driving the rotor without the disadvantages of the slotted stator configuration.

These and various other advantages and features of novelty which characterize the invention are pointed out with particularity in the claims annexed hereto and forming a part hereof. However, for a better understanding of the invention, its advantages, and the objects obtained by its use, reference should be made to the drawings which form a further part hereof, and to the accompanying descriptive matter, in which there is illustrated and described a preferred embodiment of the invention.

BRIEF DESCRIPTION OF THE DRAWINGS

FIG. 3 is an isometric schematic depicting the initial winding steps in the method according to the invention;

FIG. 3a is an enlarged side view, partially broken away, of the coils wound on the mandrel after securing their relative axial positions as with pieces of tape;

FIG. 6 is an enlarged top view of the wound coils of FIG. 4 after having been flattened into a two-layered web in conformance with another step in the method of the invention;

DETAILED DESCRIPTION OF THE PREFERRED EMBODIMENT(S)

Figures 1, 2, 4, 5:
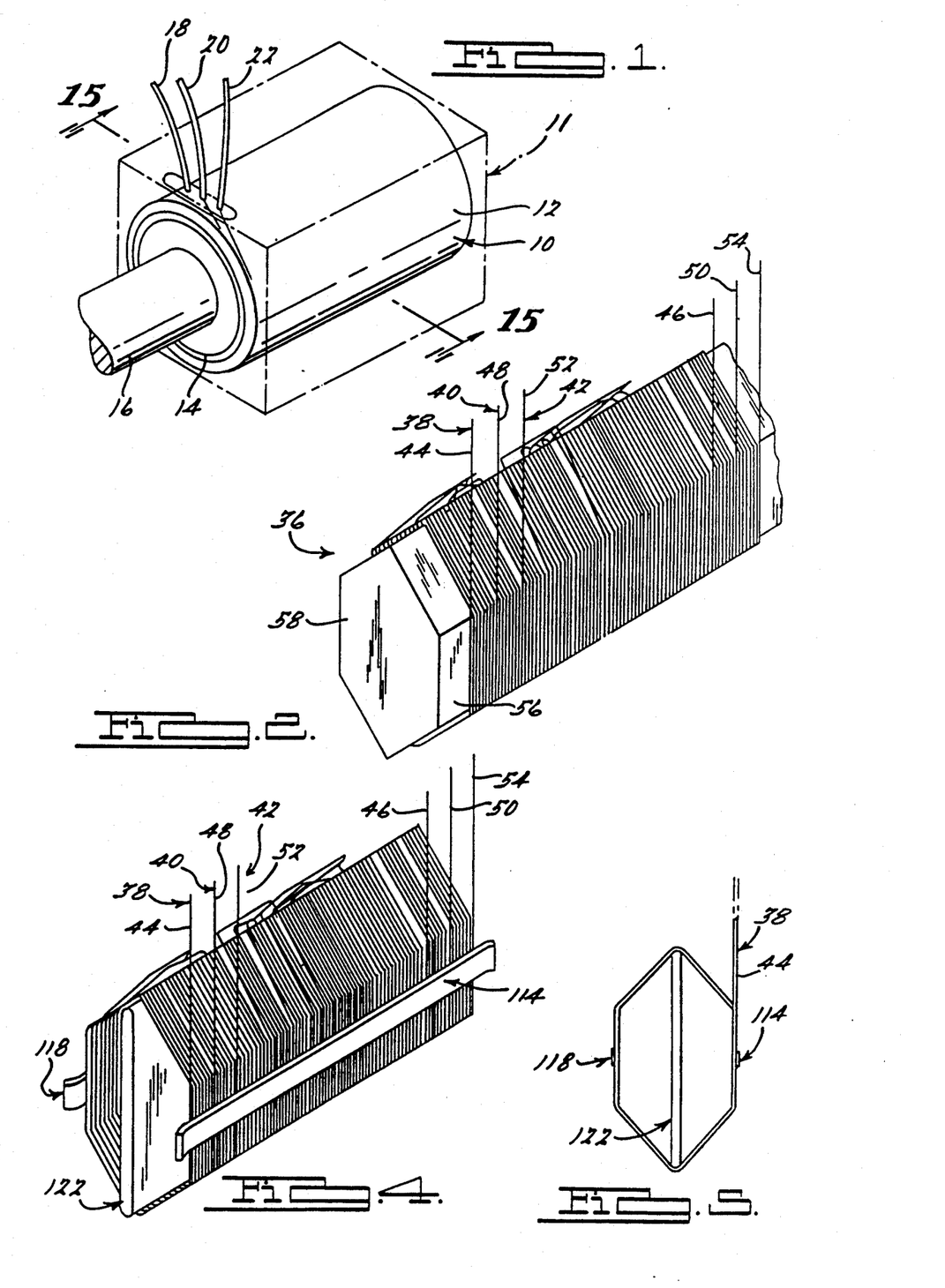
FIG. 1 is a partially diagrammatical perspective view of an electric motor constructed according to a preferred embodiment of the invention.
FIG. 2 is a perspective view depicting the first, second and third conductors wound around a mandrel, according to the invention.
FIG. 4 is a perspective view depicting the wound coils after removing the mandrel and inserting the insert.
FIG. 5 is a and view of the wound coils shown in FIG. 4.
Figure 2:
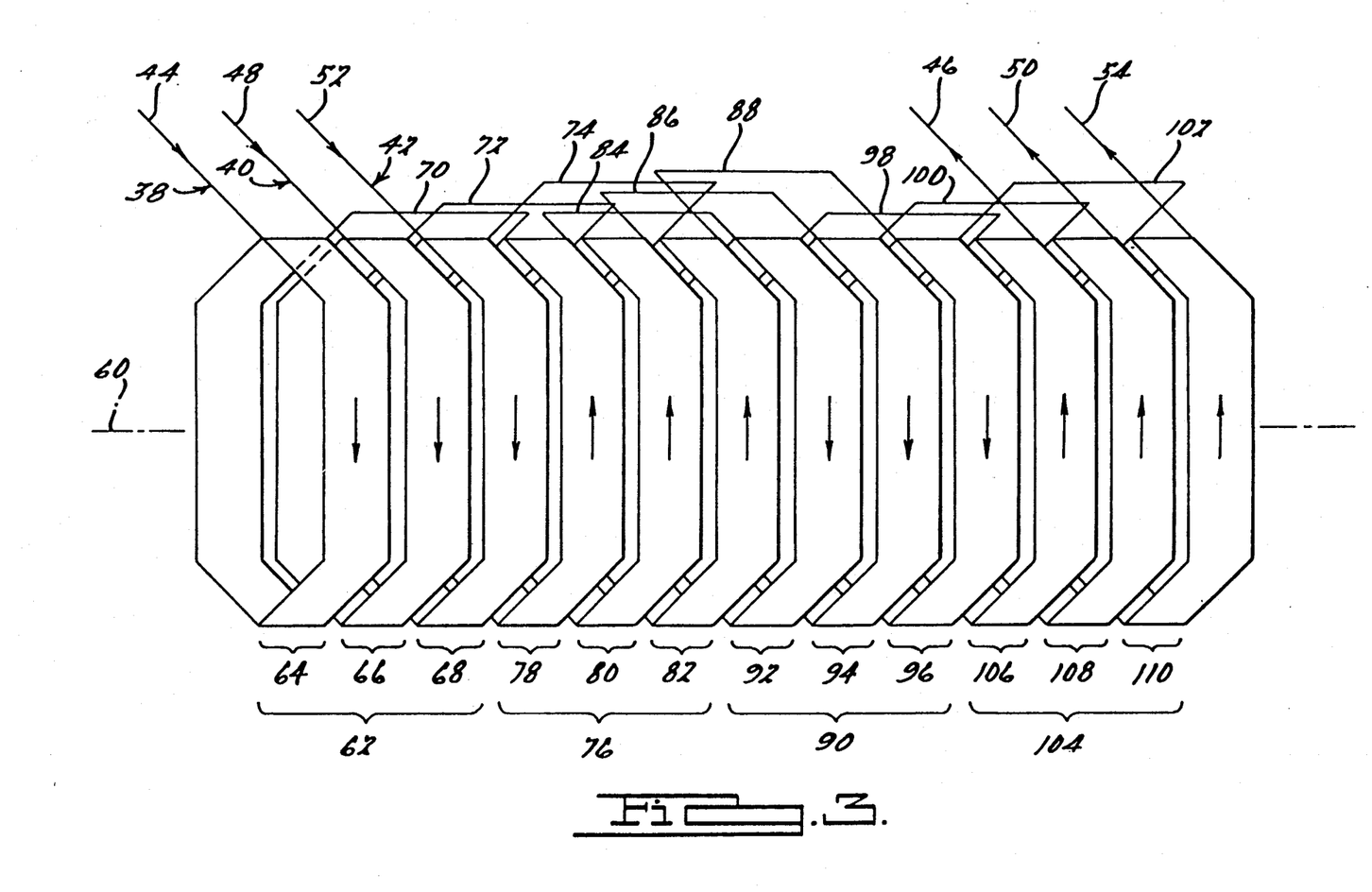
Figure 2A:
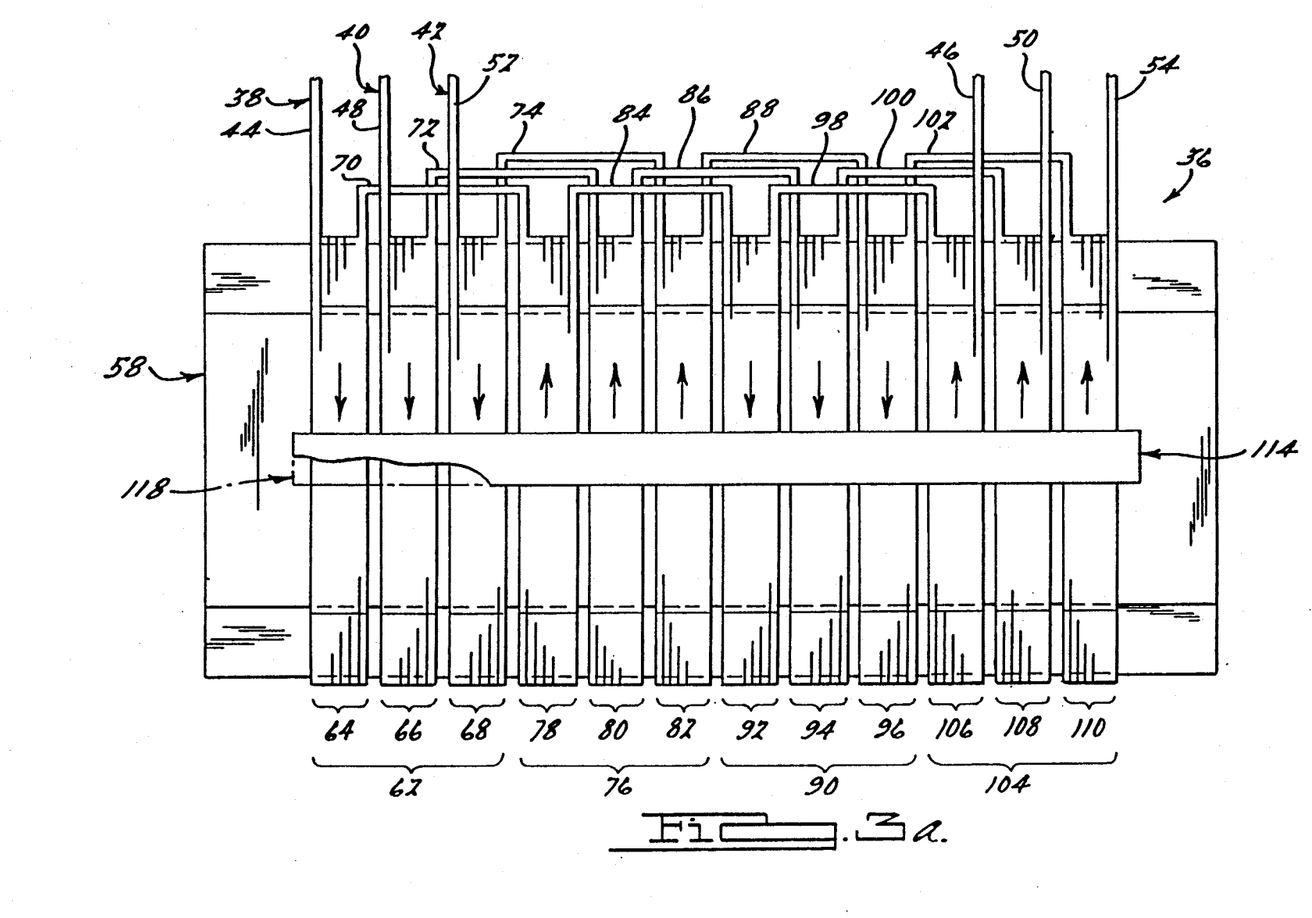
Figure 4:
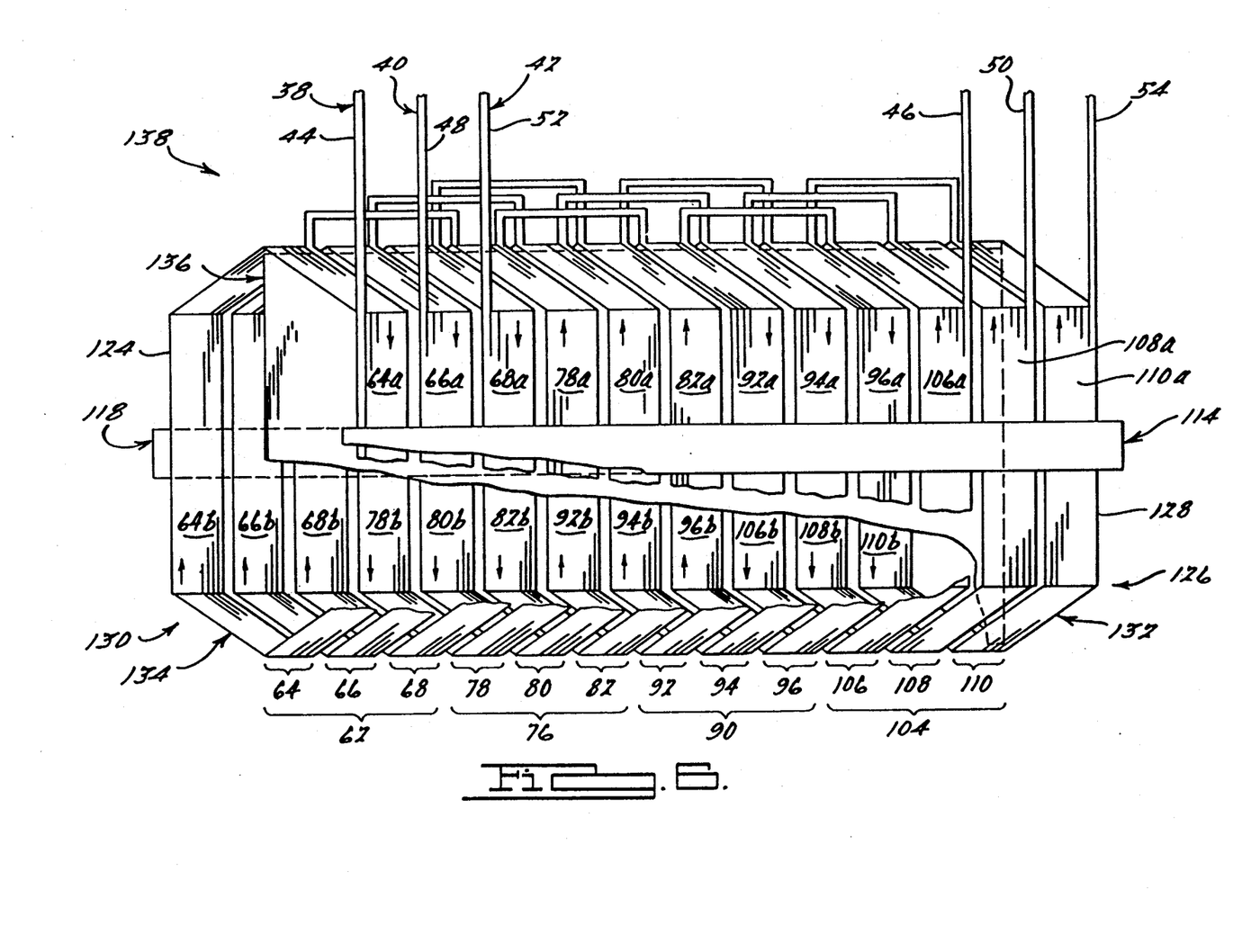

Referring now to the drawings, wherein like reference numerals designate corresponding structure throughout the views, and referring in particular to FIG. 1, an electric motor 10 according to the invention includes a stationary stator assembly 12 and a rotor 14 which is mounted for rotation within the stator assembly 12. As is shown in FIG. 1, motor 10 may be incorporated into a power tool assembly 11. Power tool assembly 11 can be any type of tool which can be powered by an electric motor, for example hand tools such as drills and saws, portable tools such as transportable saws, as well as stationary bench tools. Power tool assembly 11 could also be a lawnmower or other type of garden tool; the possibilities are too numerous to comprehensively list. In alternative embodiments of the invention, reference numeral 10 could refer to an electrical generator or alternator, which are very similar in construction to an electric motor.

Rotor 14 is connected to a shaft 16, which acts as a mechanical output for the energy which is converted by the electric motor 10. A number of wires 18, 20, 22 lead into the motor 10 for connection to the stator assembly 12, in a manner that will be discussed in greater detail below.

Figure 15:
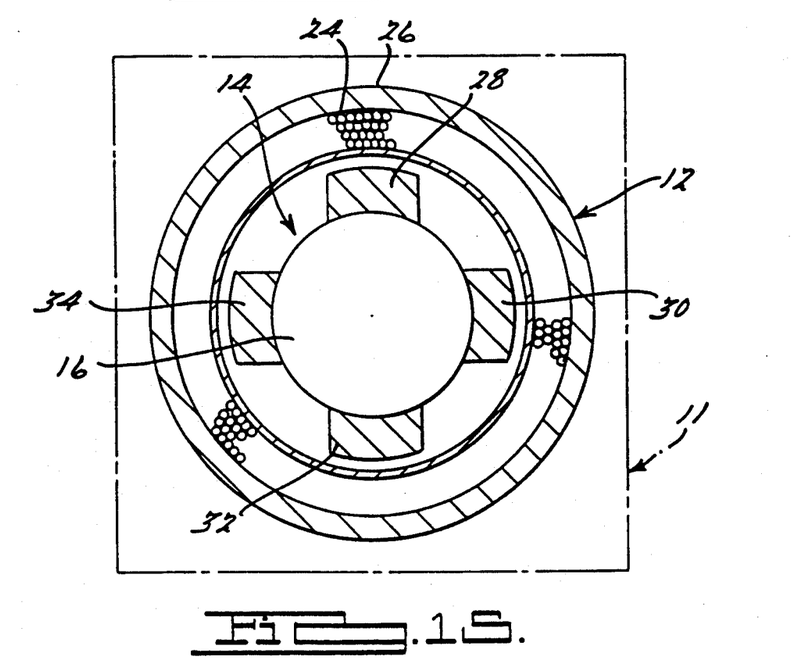
FIG. 15 is a simplified cross-sectional view of the electric motor of FIG. 1 along line 15—15 thereof.

Referring briefly to FIG. 15, which is a simplified cross-sectional view through the stator assembly 12, rotor 14 and shaft 16 of the motor 10 shown in FIG. 1. it will be seen that the inner periphery of stator assembly 12 is lined by a wound field 24. Wound field 24 is cylindrically shaped, and throughout its thickness it is nearly completely filled with conductors. It will be noted that wound field 24 is self-supporting in the sense that it does not require teeth and slots to properly orient the individual conductors therein with respect to the rotor 14. The specific construction of wound field 24 and the orientation of the conductor therein will be described in greater detail below with reference to its method of manufacturing.

As is further shown in FIG. 15, stator assembly 12 includes a magnetic return path 26 into which the wound field 24 is inserted. Magnetic return path 26 can be constructed as either a laminated ring return path, or a powder metal return path where the individual conductive particles are electrically insulated from each other, the construction of both being well known to those skilled in the field. In the embodiment illustrated in FIG. 15, rotor 14 includes four permanent magnetic poles, 28, 30, 32, 34, which are spaced at 90° intervals about the circumference and along the length of rotor 14. In the illustrated embodiment, wound field 24 and rotor 14 are constructed for operation under a three phase alternating current (AC) power input. The specific construction of rotor 14 and wound field 24 can be modified as necessitated by different types of power input, or according to known variations in electric motor construction, and still be equally within the invention.

Looking now to FIGS. 2-14, a preferred method according to the invention for manufacturing the wound field 24 and for assembling a manufactured wound field 24 into the magnetic return path 26 to form a completed stator assembly 12 will now be described. Referring first to FIGS. 2 and 3, a first step in such a process involves the fabrication of a coil assembly 36. It should be understood, however, that the following description is specific to a winding of a wound core 24 for a three phase alternating current motor. The invention applies equally to other winding configurations, the fabrication of which according to the invention may slightly differ from that which is described below.

As illustrated in FIG. 2, a first insulated conductor 38, a second insulated conductor 40, and a third insulated conductor 42 are wound about a mandrel 58. In the preferred embodiment of the invention, mandrel 58 is provided with a hexagonal outer surface 56, although other polygonal shapes having an even number of sides will work nearly as satisfactorily. First insulated conductor 38 has a first end 44 and a second end 46. Second insulated conductor 40 has a first end 48 and a second end 50. Third insulated conductor 42 has a first end 52 and a second end 54, as is shown in FIGS. 2 and 3. Preferably, mandrel 58 is symmetrical in shape about an axis 60.

As is perhaps best shown in FIG. 3, the first, second, and third insulated conductors 38, 40, 42 are simultaneously wound about a first end portion of mandrel 58 in a first direction which is indicated by the downward arrows in FIG. 3 to form, respectively, a first coil unit 64, a second coil unit 66, and a third coil unit 68. This winding process can be performed by rotating the mandrel 58, or, alternatively, by leading the respective insulated conductors 38, 40, 42 mechanically about the periphery of the mandrel 58. Thus, FIG. 3 depicts the winding of the first insulated conductor 38 in a clockwise direction about the mandrel 58 to form the first coil unit 64. The second insulated conductor is also wound in the clockwise direction about mandrel 58 to form the second coil unit 66. The third insulated conductor 42 is also wound in a clockwise direction, simultaneously with the winding of the first and second coil units 64, 66, to form the third coil unit 68. In the preferred embodiment of the invention, each coil unit 64, 66, 68 constitutes eight to twelve windings of the respective insulated conductor 38, 40, 42 about the mandrel 58. Taken together, the first, second and third coil units 64, 66, 68 form what will be referred to as the first winding group 62 of coils.

Once the first group 62 of coil units has been wound, the insulated conductors 38, 40, 42 are shifted axially with respect to the axis 60 of mandrel 58 for a distance of approximately twice the width of one of the coil units 64, 66, 68. These axial shifts of the three insulated conductors 38, 40, 42 are illustrated in FIG. 3 as 70, 72, 74 respectively. The first shift 70 of the first insulated conductor 38 will position the insulated conductor 38 immediately adjacent to the last winding in the third coil unit 68, as is shown in FIG. 3. The first axial shift 72 of the second insulated conductor 40 will be spaced approximately the width of one coil unit farther along the mandrel 58 from where the first shift 70 of the first conductor 38 terminates, and the first shift 74 of the third conductor 42 will be spaced an additional coil unit width along the mandrel from where the shift 72 of the second conductor 40 terminates. Thus, the insulated conductors 38, 40, 42 are positioned to wind a second group 76 of coil units.

The second group 76 of coil units is wound in a second direction which is opposite to the direction in which the first group 62 of coil units was wound. In the embodiment shown in FIG. 3, the second group 76 of coil units is wound in a counterclockwise direction, as represented by the upward arrows. To wind the second group 76 of coil units, the first, second, and third insulated conductors 38, 40, 42 are simultaneously wound in a counterclockwise direction for the same number of turns that was used to wind the first group 62 of coil units. As a result, first insulated conductor 38 will form a fourth coil unit 78, second insulated conductor 40 will form a fifth coil unit 80, and third insulated conductor 42 will form a sixth coil unit 82. Once the coil units 78, 80, 82 are wound, the insulated conductors 38, 40, 42 are axially shifted a second time for a distance approximately equal to two coil unit widths, so as to position the conductors 38, 40, 42 for the winding of a third coil unit group 90. Thus, the first insulated conductor 38 takes a second axial adjustment 84, the second insulated conductor 40 takes a second axial adjustment 86, and the third insulated conductor 48 takes a second axial adjustment 88. To wind the third group 90 of coil units, the insulated conductors 38, 40, 42 are wound in the same direction as the first group 62 of coil units was wound, which is opposite to the direction which the second group 76 of coil units was wound. In the illustrated embodiment, the third group 90 of coil units is wound in a clockwise direction, as indicated by the downward arrows in FIG. 3. The first, second, and third insulated conductors 38, 40, 42 are simultaneously wound for the same number of turns that the first and second coil groups 62, 76 were wound. As a result, first insulated conductor 38 forms a seventh coil unit 92, second insulated conductor 40 forms an eighth coil unit 94 and third insulated conductor 42 forms a ninth coil unit 96.

At this point, the insulated conductors, 38, 40, 42 again simultaneously take an axial shift which is approximately equal to the width of two coil units. The third axial shift of first insulated conductor 38 is represented by reference numeral 98 in FIG. 3. The third axial shift of second conductor 40 is represented by the reference numeral 100, and the third axial shift of insulated conductor 42 is represented by the reference numeral 102 in FIG. 3. Once the insulated conductors 38, 40, 42 are thus positioned, a fourth group 104 of coil units is wound, in a direction which is the same as the direction in which the second coil group 76 was wound. In the embodiment shown in FIG. 3, this is a counterclockwise winding, in which the first insulated conductor 38 forms a tenth coil unit 106, the second insulated conductor 40 forms an eleventh coil unit 108, and the third insulated conductor 42 forms a twelfth coil unit 110. After the fourth coil group 104 is wound, the second ends 46, 50, 54 of the respective conductors 38, 40, 42 are extended from the formed winding assembly 36 for later connection after the wound core 24 has been fabricated, as will be described in greater detail below.

Referring now to FIGS. 3a, 4 and 5, a structure is applied to the formed winding assembly 36 to permit removal of the winding assembly 76 from the hexagonal mandrel 58 without deforming the shape or the respective relationship of the coils within the winding assembly 36. Preferably, the securing structure takes the form of at least two strips 114 and 118 of adhesive tape, which are applied longitudinally with respect to the axis of the mandrel 58 along opposite outer surfaces of the winding assembly 36. As is shown in FIG. 3a, the first strip 114 of adhesive tape is applied longitudinally along one outer surface of the assembly 36. The second strip 118 is applied to an outer surface of the winding assembly 36 which is diametrically opposed from the outer surface to which the first strip 114 has been applied. At this point, the winding assembly 36 is removed from the mandrel 58.

After the winding assembly 36 has been removed from the mandrel 58, an insert 122 is preferably inserted within the winding assembly 36, as seen in FIGS. 4 and 5. Insert 122 is most preferably a strip formed of a "B" stageable fiberglass with an epoxy coating, and preferably has a width which is just slightly less than the maximum distance between two of the vertices in the hexagonally shaped inner periphery of the winding assembly 36.

Figures 7, 8:
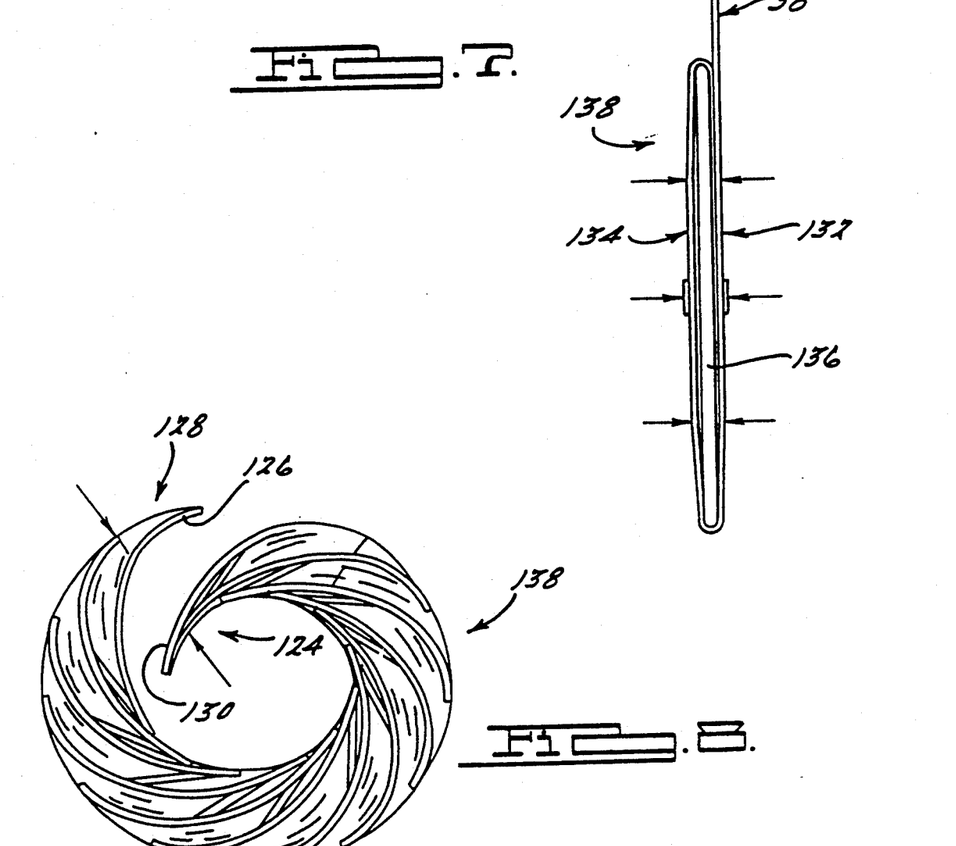
FIG. 7 is an enlarged partially diagrammatical end view depicting performance of the flattening step to obtain the flat two-layered web illustrated in FIG. 6.
FIG. 8 is a partially diagrammatical end view depicting formation of the wound field by joining the ends of the flat two-layered web.

Referring now to FIGS. 6 and 7, the secured winding assembly 36 with the insert 122 therein is then flattened to form a substantially flat two-layered web 138 which has a first axial end 124 defined by the first coil unit 64 and a second axial end 128 defined by the twelfth coil unit 110. As is best shown in FIG. 7, the flat, two-layered web 138 includes a first layer 132 and a second layer 134 which is opposed from the first layer 132. A core 136 formed by the insert 122 is positioned between the first and second layer 132, 134.

As may be seen in FIG. 6, the flattening step is conducted so that the first layer 132 of the web 138 is axially displaced relative to the second layer 134 to the extent that a leading single-layered web portion 126 is formed at the second axial end 128 of the web 138, and that a trailing single-layered web portion 130 is formed at the first axial end 124 of the web 138. Preferably, this displacement occurs to the extent that the leading single-layered web portion 126 at the web's second axial end 128 is formed exclusively of the axially-leading peripheral segments or legs 106a, 108a, 110a (hereinafter "leading legs" 106a, 108a, 110a) of the coil units 106, 108, 110 comprising the fourth coil group 104, as seen in FIG. 6, and so that the trailing single-layered web portion 130 at the web's first axial end 124 is formed exclusively of the axially-trailing peripheral segments or legs 64b, 66b, 68b (hereinafter "trailing legs" 64b, 66b, 68b) of the coil units 64, 66, 68 comprising the first coil group 62.

As a result, the leading legs 64a, 66a, 68a of the individual coil units 64, 66, 68 within the first coil group 62 are displaced to the extent that the leading leg 64a of the first coil unit 64 will overlie the trailing leg 78b of the oppositely-wound fourth coil unit 78; the leading leg 66a of the second coil unit 66 will overlie the trailing leg 80b of the oppositely-wound fifth coil unit 80 and the leading leg 68a ascending leg of the third coil unit 68 will overlie the trailing leg 82b of the oppositely-wound sixth coil unit 82. Similarly, the leading legs 78a, 80a, 82a of the fourth, fifth, and sixth coil units 78, 80, 82 of the second coil group 76 are displaced so as to overlie the trailing legs 92b, 94b, 96b of the oppositely-wound seventh, eighth, and ninth coil units 92, 94, 96, respectively. The leading legs 92a, 94a, 96a of the seventh, eighth, and ninth coil units 92, 94, 96 are likewise displaced so as to overlie the trailing legs 106b, 108b, 110b of the oppositely-wound tenth, eleventh, and twelfth coil units 106, 108, 110, respectively. As will be seen in the subsequent assembly step described with reference to FIG. 8, the leading legs 106a, 108a, 110a of the tenth, eleventh, and twelfth coil units 106, 108, 110 are likewise displaced so that they may ultimately overlie the trailing legs 64b, 66b, 68b of the oppositely-wound first, second and third coil units 64, 66, 68, respectively, upon the joining together of the first and second ends 124, 128 of the web 138.

As a result, after having joined together the ends 124, 128 of the web 138, each of the leading legs 64a, 78a, 92a, 106a wound from the first insulated conductor 38 will overlie a trailing leg 78b, 92b, 106b, 64b of the next successive, oppositely-wound coil unit which is also wound from the first insulated conductor 38. Each of the leading legs 66a, 80a, 94a, 108a wound from the second insulated conductor 40 will overlie a trailing leg 80b, 94b, 108b, 66b of the next successive, oppositely-wound coil unit which is also wound from the second insulated conductor 40. Similarly, each of the leading legs 68a, 82a, 96a, 110a wound from the third insulated conductor 42 will overlie a trailing leg 82b, 96b, 110b, 68b of the next successive, oppositely-wound coil unit which is also wound from that conductor. This ensures that the currents in overlying coil unit legs will be flowing in the same direction and, thus, result in a compatible, mutually-reinforcing electro-magnetic field. It should be noted that this will occur regardless of the particular wire connection arrangement that is applied to the winding.

In other embodiments of the invention, a winding can be fabricated from fewer or more than the three insulated conductors that are depicted in the preferred, illustrated embodiment. In such cases, the number of coil units in a particular winding group will correspond to the number of conductors that are being used. Upon compaction, it is essential that the leading leg of a particular coil unit overlie the trailing leg of another coil unit which is wound from the same insulated conductor, but in the opposite direction. This will ordinarily be achieved if the leading singled-layered web portion 126 is formed of the leading legs of the first coil group in the winding assembly, and if the trailing singled-layered web portion 130 is formed of the trailing legs of a last coil group in the winding assembly.

Referring now to FIG. 8, the flat web 138 is rolled end-to-end, so that the leading single-layered ascending web portion 126 at its second axial end 128 overlies the trailing single-layered descending web portion 130 at the first axial end 124. As a result, a wound field 24 having a nearly perfect cylindrical shape is created.

Figure 9:
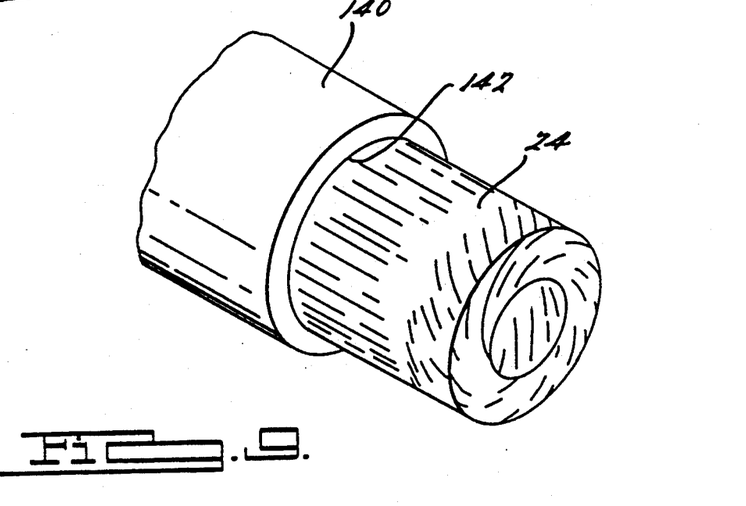
FIG. 9 is a partially diagrammatical fragmentary perspective view depicting the insertion of the wound field into a performed magnetic return path.

Looking now to FIG. 9, the cylindrical wound field 24 is then inserted into a cylindrical space defined by an inner wall 142 of a preformed magnetic return path 140. A pre-preg epoxy cloth can optionally be inserted between the wound field 24 and the inner wall 142 of the return path 140 to insulate the inner wall 142 from the wound field 24. Alternatively, the inner wall 142 can be coated with an epoxy powder to achieve the electrical insulation between the return path 140 and the wound field 24.

Figures 10, 11, 12, 13:
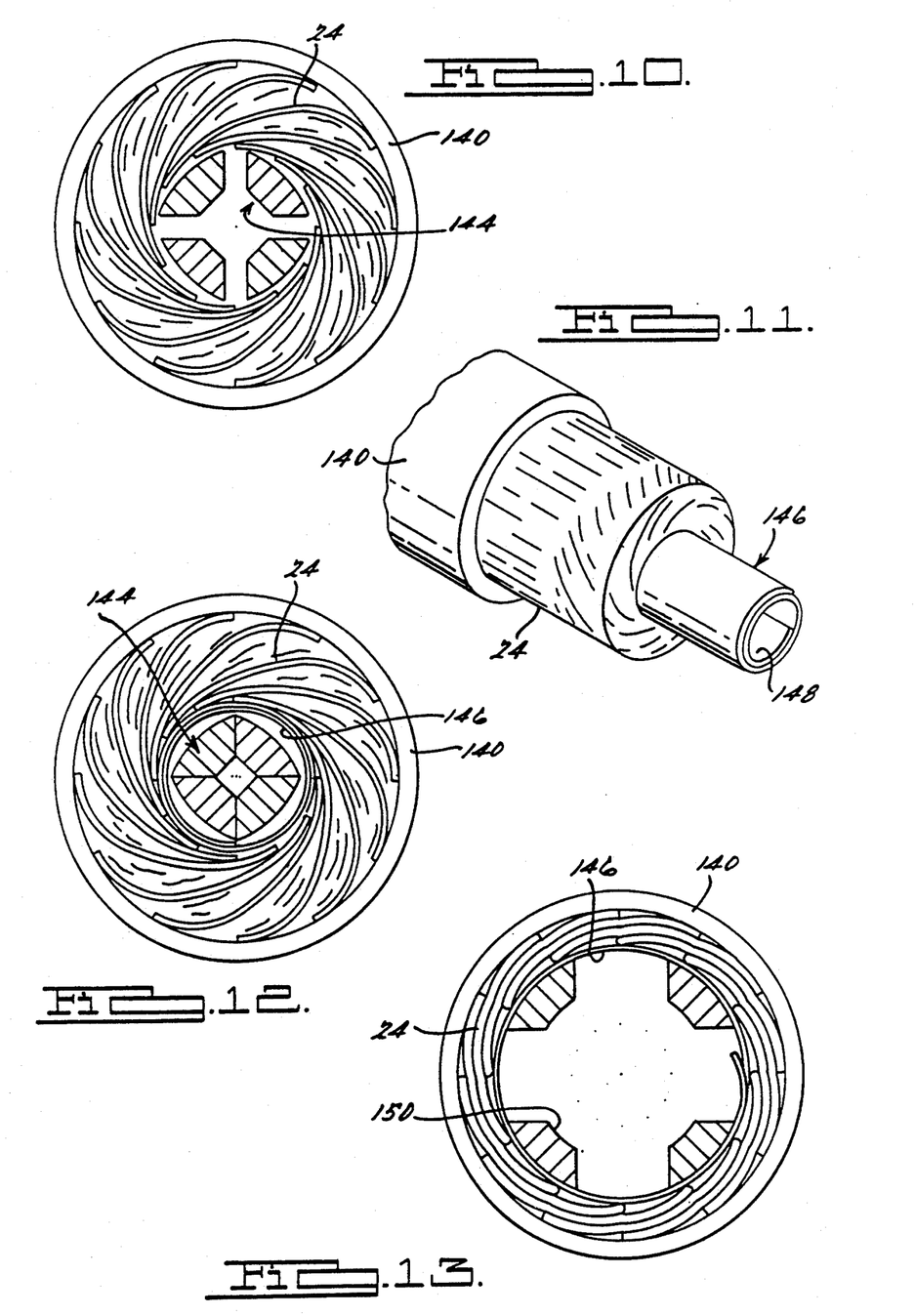
FIG. 10 is a partially diagrammatical end view depicting the wound field in the magnetic return path after insertion of an expandable arbor thereinto.
FIG. 11 is a partially diagrammatical fragmentary perspective view depicting the insertion of an inner cylinder into the wound field subsequent to its compaction.
FIG. 12 is a partially diagrammatical end view showing an expandable arbor inserted into the inner cylinder prior to expanding the cylinder against the compacted wound field (while further compressing same)
FIG. 13 is a partially diagrammatical end view depicting the structure illustrated in FIG. 12 after the arbor has expanded the inner cylinder against the further compacted wound field.
Figure 14:
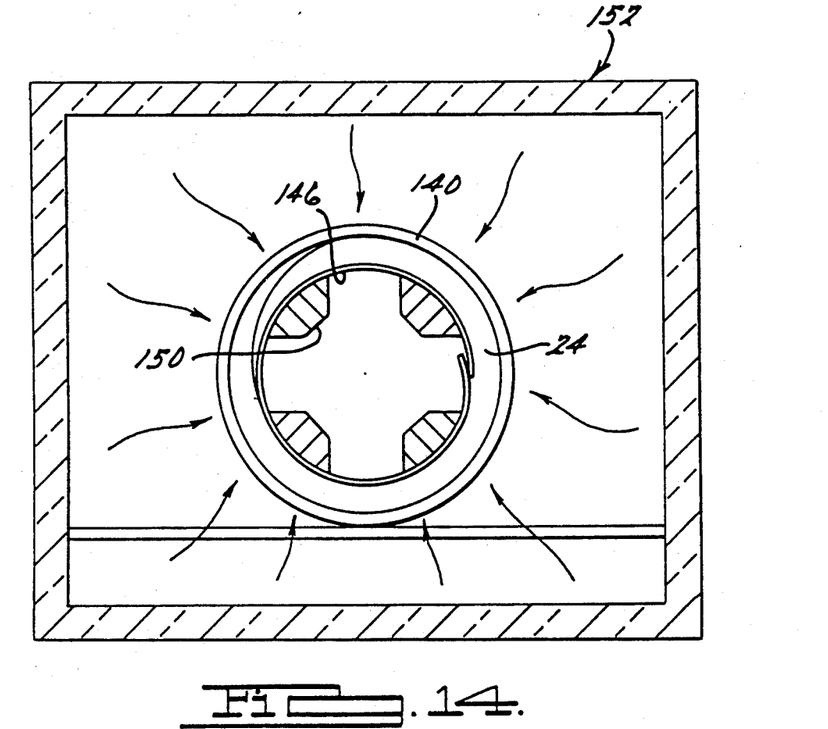
FIG. 14 is a diagrammatical view depicting the heating of the structure illustrated in FIG. 13.

Once the wound field 24 has been inserted into the return path 140, an expandable arbor 144 is inserted into the space defined by the inner periphery of the wound field 24, as is shown in FIG. 10. The arbor 144 is then expanded, thus compacting the wound field 24 tightly against the inner wall 142 of the magnetic return path 140. After this expansion has been performed, the arbor 144 is removed, and a cylinder 146 which is fabricated from an epoxy fiberglass pre-preg material is inserted into the expanded space defined by the inner periphery of the wound field 24. This process is illustrated in FIG.

11. Once the cylinder 146 has been inserted into the wound field 24, the expandable arbor 144 is reinserted into the space defined by an inner surface 148 of the cylinder 146. This process is illustrated in FIG. 12. At this point, the expandable arbor is then expanded, thus expanding the cylinder 146 and again compressing the wound field 24 against the inner wall 142 of the magnetic return path 140. The second expansion step is depicted by FIG. 13. Once this is done, the entire assembly, including the expandable arbor 144 and its expanded legs 150, is inserted into an oven 152 or an equivalent heating apparatus. At this point, heat is applied to cure the expanded cylinder 146, and the core 136 of the wound field 24. Once this is completed, the stator assembly 12 is ready for assembly into an electric motor 10. Alternatively, the heat curing process could be achieved through electric resistance heating.

Once the electric motor 10 has been so fabricated, it can be installed into a power tool assembly 11, or into whatever type of apparatus in which a high efficiency electric motor can be used.

Alternatively, the method according to the invention could be used to manufacture an electrical generator or alternator, which are structurally very similar to motors.

It is to be understood, however, that even though numerous characteristics and advantages of the present invention have been set forth in the foregoing description, together with details of the structure and function of the invention, the disclosure is illustrative only, and changes may be made in detail, especially in matters of shape, size and arrangement of parts within the principles of the invention to the full extent indicated by the broad general meaning of the terms in which the appended claims are expressed.

What is claimed is:

1. A method of making a wound field for an electric motor, generator or alternator, said method comprising the steps of:
    continuously winding an insulated conductor about a mandrel to obtain a coil having a first plurality of individual windings wound in a first direction about said mandrel, and a second plurality of windings wound in a second direction about said mandrel opposite the first direction thereabout;
    flattening said coil to obtain a substantially flat, two-layered web having a first end and a second end, wherein a peripheral section of one of said first plurality of windings overlies a corresponding diametrically-opposite peripheral section of one of said second plurality of windings; and joining
    the first end of said web to the second end thereof so that a peripheral section of another of said second plurality of windings overlies a corresponding diametrically-opposite peripheral section of another of said first plurality of windings.

2. A method according to claim 1, further comprising the step of securing the individual windings in position with respect to each other after said winding step to permit removal of said coil from a winding station.

3. A method according to claim 2, wherein said securing step is performed by placing at least one length of adhesive tape longitudinally along an outer surface of said coil transverse to the direction in which said individual windings extend.

4. A method according to claim 1, further comprising the step of placing a non-conductive material inside said coil prior to said flattening step.

5. A method according to claim 4, wherein said placing step comprises inserting a non-conductive strip inside said coil.

6. A method according to claim 5, wherein said non-conductive strip is comprised of a reinforced polymer.

7. A method of making a stator assembly for an electric motor, generator or alternator comprising:
    fabricating a wound field by:
    continuously winding an insulated conductor about a mandrel to obtain a coil having a first plurality of individual windings wound in a first direction about said mandrel, and a second plurality of windings wound in a second direction about said mandrel opposite the first direction thereabout;
    flattening said coil to obtain a substantially flat, two-layered web having a first end and a second end, wherein a peripheral section of one of said first plurality of windings overlies a corresponding diametrically-opposite peripheral section of one of said second plurality of windings; and joining
    the first end of said web to the second end thereof so that a peripheral section of another of said second plurality of windings overlies a corresponding diametrically-opposite peripheral section of another of said first plurality of windings;
    inserting said wound field into a magnetic return path; and
    inserting a sleeve member into said wound field, said sleeve member defining an interior space in which a rotor assembly may be constrained to rotate.

8. A method according to claim 7, further comprising the step of radially expanding said wound field against said return path before insertion of said sleeve member so as to radially compress said wound field after said wound field is inserted into said return path.

9. A method according to claim 7, further comprising the step of radially expanding said sleeve member against said return path after said sleeve member has been inserted into said return path.

10. A method according to claim 9, wherein said expanding is performed by inserting an expandable arbor into said sleeve member.

11. A method according to claim 7, further comprising the step of heat curing the stator assembly after the sleeve member is inserted.

12. A method of making a multiphase wound field for an electric motor, generator or alternator comprising:
    (a) simultaneously winding at least two insulated conductors about a common axis at axially spaced intervals in a first winding direction to form a group of at least two adjacent coil units;
    (b) axially shifting the insulated conductors with respect to the coil units by a distance of approximately (n−1) times the axial width of a coil unit, with n being the number of conductors being wound;
    (c) simultaneously winding a second group of adjacent coil units as provided in step (a) in a second winding direction which is opposite the first winding direction, the second group of coil units being adjacent to the first group of coils;
    (d) compressing the adjacent coil groups into a substantially flat, two-layered web having a first axial end and a second axial end; and
    (e) rolling the flat web into a wound field by joining the first axial end to the second axial end.

13. A method according to claim 12, wherein the number of conductors being wound is equal to three.

14. A method according to claim 12 wherein steps (a) and (c) are performed by winding the insulated conductors about a common mandrel 15. A method according to claim 14, wherein said mandrel is shaped in a polygonal form to facilitate precise compression of the coil groups in step (d).

16. A method according to claim 15, wherein the mandrel is hexagonal in shape.

17. A method according to claim 12, further comprising repeating steps (a), (b), and (c) one or more times prior to step (d), thereby providing more than two adjacent groups of coil units.

18. A method according to claim 15, wherein step (d) is performed so that a peripheral section of each coil unit wound in the first winding direction overlies a corresponding diametrically-opposite peripheral section of another coil unit wound in the second winding direction, whereby a leading peripheral section of a first end coil unit and a trailing peripheral section of a second end coil unit are exposed as single-layered web portions at the first and second axial ends, respectively, of the flat, two-layered web.

19. A method according to claim 18, wherein step (e) comprises joining the first axial end to the second axial end so that the leading peripheral section of the first end coil unit overlies the trailing peripheral section of the second end coil unit.

20. A method according to claim 12, further comprising the step of securing the individual windings in position with respect to each other after said winding step to permit removal of said coil from a winding station 21. A method according to claim 20, wherein said securing step is performed by placing at least one length of adhesive tape longitudinally along an outer surface of said coil transverse to the direction in which said individual windings extend.

22. A method according to claim 12, further comprising the step of placing a non-conductive material inside said coil prior to said compressing step.

23. A method according to claim 22, wherein said placing step comprises inserting a non-conductive strip inside said coil.

24. A method according to claim 23, wherein said non-conductive strip is comprised of a reinforced polymer.

25. A method according to claim 12, further comprising the step of inserting said wound field into a magnetic return path.

26. A method of winding a coreless and slotless stator for an electric motor, generator or alternator comprising:
(a) simultaneously winding two insulated conductors about a common axis in a first circumferential winding direction to form a first group of two discrete axially spaced coil units;
(b) axially shifting each of the insulated conductors with respect to said first group of coil units to a position wherein said conductors are conditioned for the winding of a second group of discrete axially spaced coil units in axially spaced relation to said first group of coil units;
(c) simultaneously winding said conductors in a second circumferential winding direction opposite the first circumferential winding direction to form the second group of coil units;
(d) reconfiguring all of said coil units by concomitantly
(1) radially compressing said coil units into a substantially flat, two-layered web, and
(2) axially displacing one layer of said web relative to the other layer of said web a distance substantially equal to the axial dimension of one of said coil groups; and
joining opposite ends of said web to form a cylindrical stator and thereby superimpose the portions of the coil unit at one end of said web and lying in the first layer thereof over the portions of the coil unit lying at the opposite end of said web and in the second layer thereof whereby current flows in the same direction in each of the conductors in the superimposed layers of each coil unit thereby to produce a compatible, mutually reinforcing electro-magnetic field.

27. A method of making a multiphase wound field for an electric motor, generator or alternator comprising:
(a) simultaneously winding at least two insulated conductors about a common axis at axially spaced intervals in a first winding direction to form a first group of at least two adjacent coil units;
(b) axially shifting the at least two insulated conductors by a predetermined distance relative to the first group of coil units;
(c) simultaneously winding the at least two axially shifted conductors about the common axis at axially spaced intervals in a second winding direction opposite the first winding direction to form a second group of at least two adjacent coil units;
(d) flattening the first and second groups of coil units to form a substantially flat, two-layered web having a first axial end and a second axial, wherein a peripheral section of each respective coil unit in said first group overlies a diametrically-opposite peripheral section of a corresponding coil unit in said second group; and
(e) joining the first axial end of said flat, two-layered web to the second axial end of said flat, two-layered web.

28. A method of making a wound field for a multiphase electric motor, generator or alternator comprising the steps of:
continuously winding at least two insulated conductors about an axis at axially-spaced intervals so as to obtain an even number of adjacent coil groups including a first coil group and a last coil group, each coil group including adjacent coil units, each coil unit of any one of said coil groups being wound from a different one of said insulated conductors, the coil units of each successive coil groups being wound in a direction opposite that of the preceding coil group;
flattening the coil groups to obtain a substantially flat, two-layered web having a first axial end and a second axial end, such that a peripheral section of each coil unit in the first coil group overlies a corresponding diametrically-opposite peripheral section of each coil unit of a successive coil group also wound from the same one of said insulated conductors; and
joining the first axial end of said web to the second axial end thereof, such that a peripheral section of each coil unit of the last coil group overlies corresponding diametrically-opposite peripheral section of the coil unit of the first coil group also wound from the same one of said insulated conductors.

29. A method of making a wound field for a multiphase electric motor, generator or alternator comprising the steps of:
   winding at least two insulated conductors about an axis at axially-spaced intervals in a first direction to form a first group of at least two adjacent coil units wound in said first direction, each of said coil units having a nominal axial width;
   axially shifting said insulated conductors with respect to the coil units of said first group by a distance related to the nominal axial width of the coil units;
   winding said insulated conductors about said axis at axially-spaced intervals in a second direction which is opposite the first direction to form a second group of at least two adjacent coil units wound in said second direction, said second group of coil units being adjacent to the first group of coil units;
   flattening the coil groups to obtain a substantially flat, two-layered web having a first axial end and a second axial end, such that a peripheral section of a first one of the coil units wound in the first direction overlies a corresponding diametrically-opposite peripheral section of a first one of the coil units wound in the second direction; and
   joining the first axial end of said web to the second axial end thereof, such that a peripheral section of a second one of the coil units wound in the second direction overlies a corresponding diametrically-opposite peripheral section of a second one of the coil units wound in the first direction.

* * * * *

UNITED STATES PATENT AND TRADEMARK OFFICE
CERTIFICATE OF CORRECTION

PATENT NO. : 5,197,180

DATED : March 30, 1993

INVENTOR(S) : Emil S. Mihalko

It is certified that error appears in the above-identified patent and that said Letters Patent is hereby corrected as shown below:

In the Abstract, line 6, after "direction" (second occurrence), insert a comma (,).

In the Abstract, line 17, "increases" should be--creates--.

Col. 2, line 22, "around" should be--about--.

Col. 2, line 27, after "end" (second occurrence), the semicolon (;) should be a comma (,).

Col. 2, line 31, after "direction" insert a semicolon (;).

Col. 3, line 31, "around" should be--about--.

Col. 3, line 38, "the" (second occurrence) should be --an--.

Col. 3, line 40, "and" should be --end--.

Col. 4, line 36, after "Fig. 1" insert a comma (,).

Col. 7, line 51, after the semicolon (;) insert--and--.

Col. 7, line 53, after "unit 80" insert a semicolon (;).

Col. 7, line 54, delete "ascending leg".

Col. 8, line 37, "singled-layered" should be--single-layered--.

Col. 8, line 39, "singled-layered" should be--single-layered--.

Col. 8, line 45, delete "descending".

UNITED STATES PATENT AND TRADEMARK OFFICE
CERTIFICATE OF CORRECTION

PATENT NO. : 5,197,180

DATED : March 30, 1993

INVENTOR(S) : Emil S. Mihalko

It is certified that error appears in the above-identified patent and that said Letters Patent is hereby corrected as shown below:

Col. 9, line 51, the word "joining" should be the first word of a new subclaim (or paragraph).

Col. 10, line 20, the word "joining" should be the first word of a new subclaim (or paragraph).

Col. 11, line 3, after "mandrel" insert a period (.).

Col. 11, line 13, due to renumbering of claims, "15" should be --12--.

Col. 11, line 31, after "station" insert a period (.).

Col. 11, line 45, after "polymer" insert a period (.).

Col. 12, line 7, before "joining" insert --(e)--.

Col. 12, line 53, "groups" should be --group--.

Col. 12, line 65, after "overlies" insert --a--.

Signed and Sealed this

Twenty-eighth Day of December, 1993

Attest:

BRUCE LEHMAN

*Attesting Officer*  *Commissioner of Patents and Trademarks*